Sept. 28, 1965    M. ZIMMERMANN    3,208,652
TROUSER PRESSING APPARATUS
Filed Aug. 21, 1962    13 Sheets-Sheet 1

Inventor:
Martin Zimmermann
by
Michael S. Striker
Atty

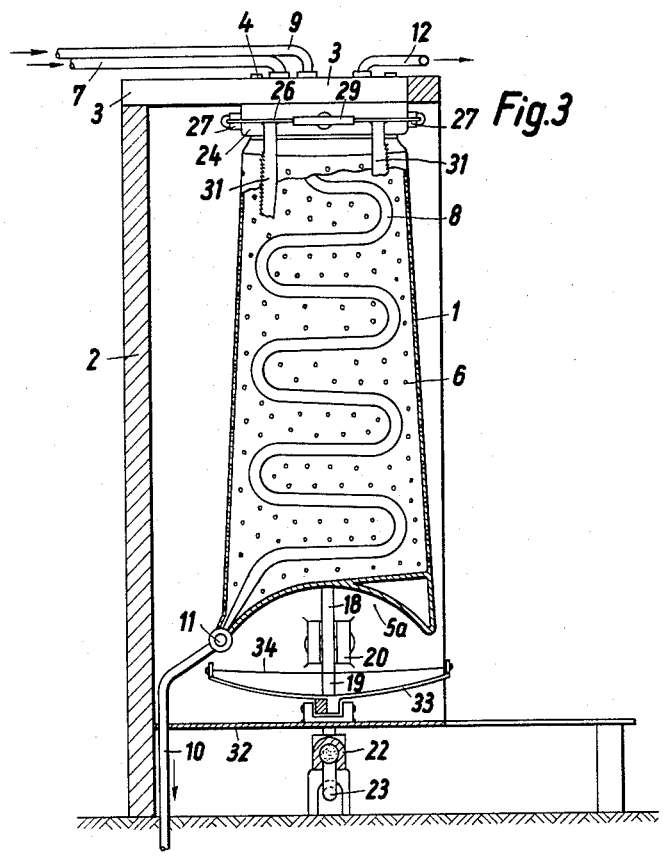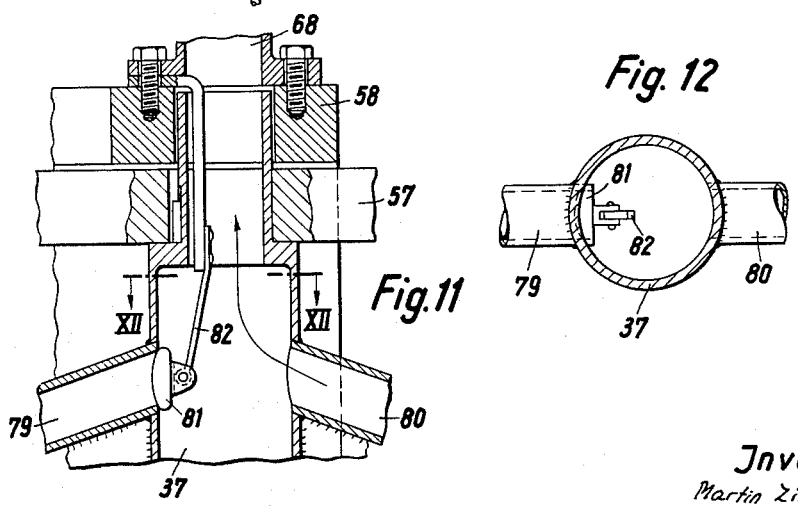

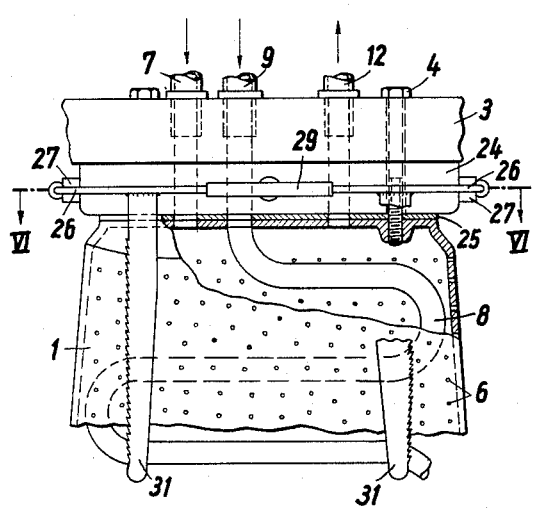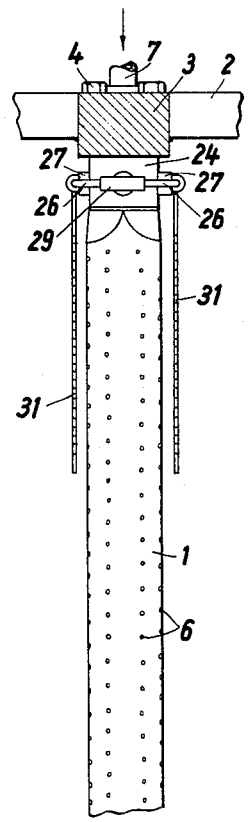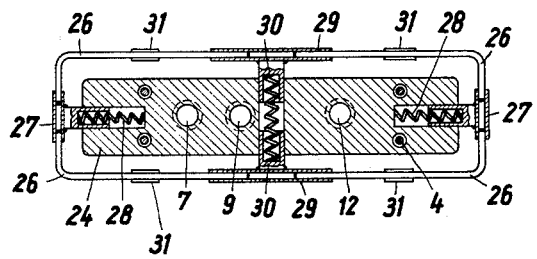

Sept. 28, 1965 M. ZIMMERMANN 3,208,652
TROUSER PRESSING APPARATUS
Filed Aug. 21, 1962 13 Sheets-Sheet 4

Inventor:
Martin Zimmermann
by
Michael S. Striker

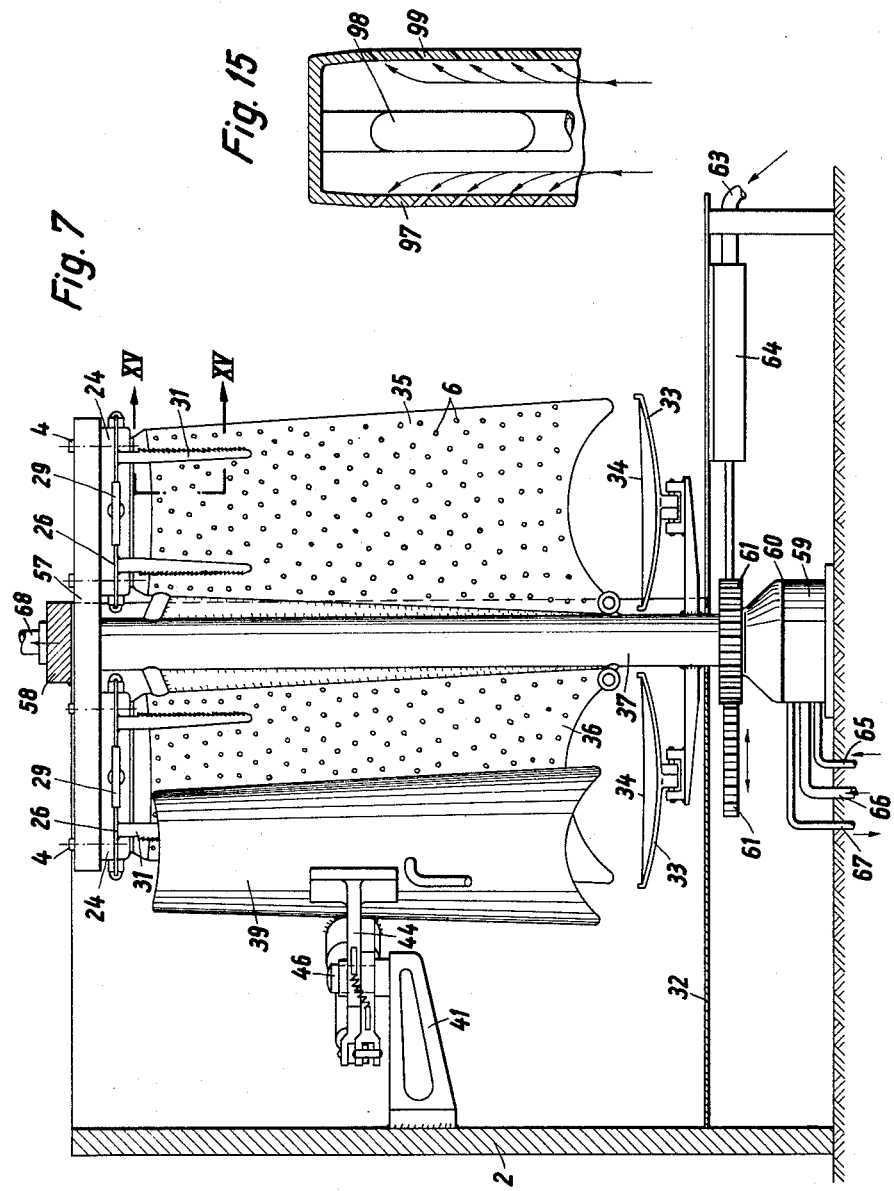

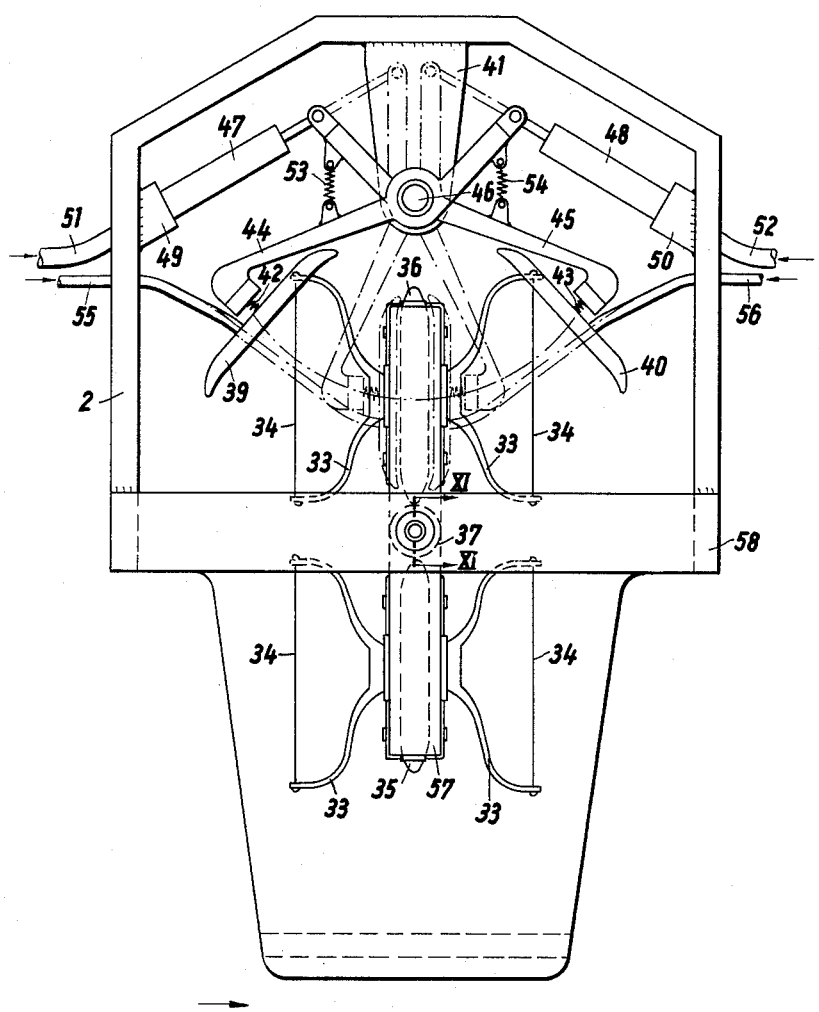

Sept. 28, 1965     M. ZIMMERMANN     3,208,652
TROUSER PRESSING APPARATUS
Filed Aug. 21, 1962     13 Sheets-Sheet 7
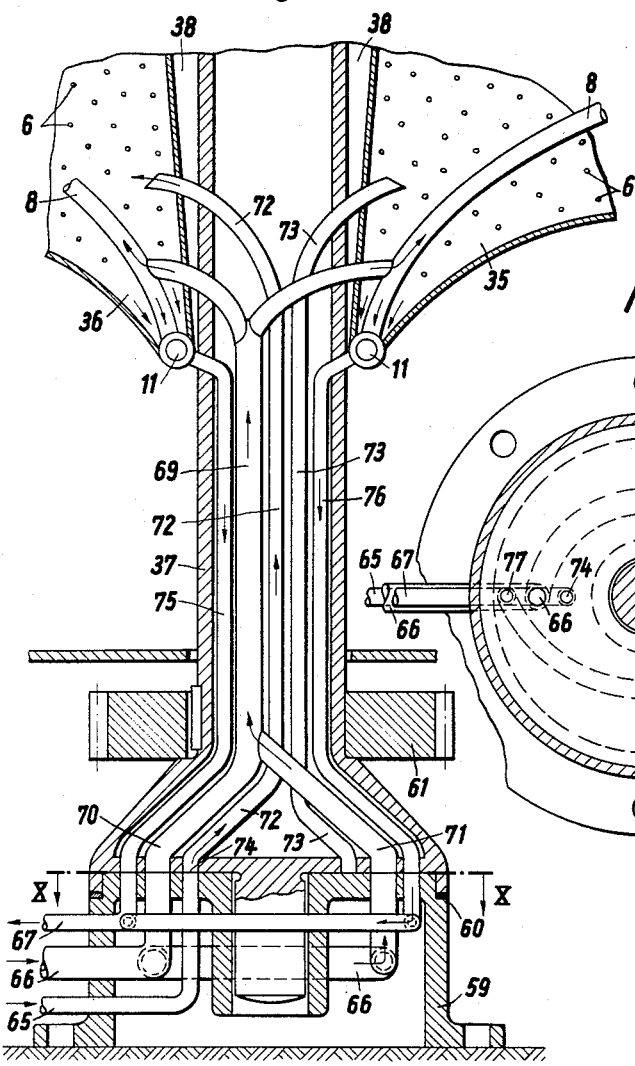
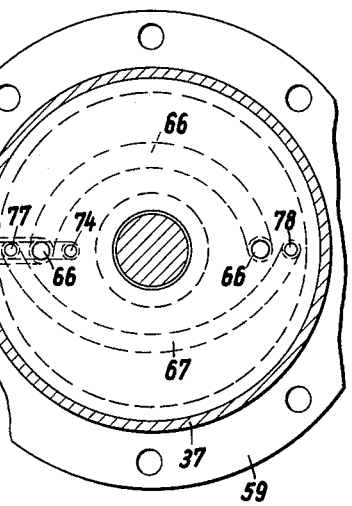

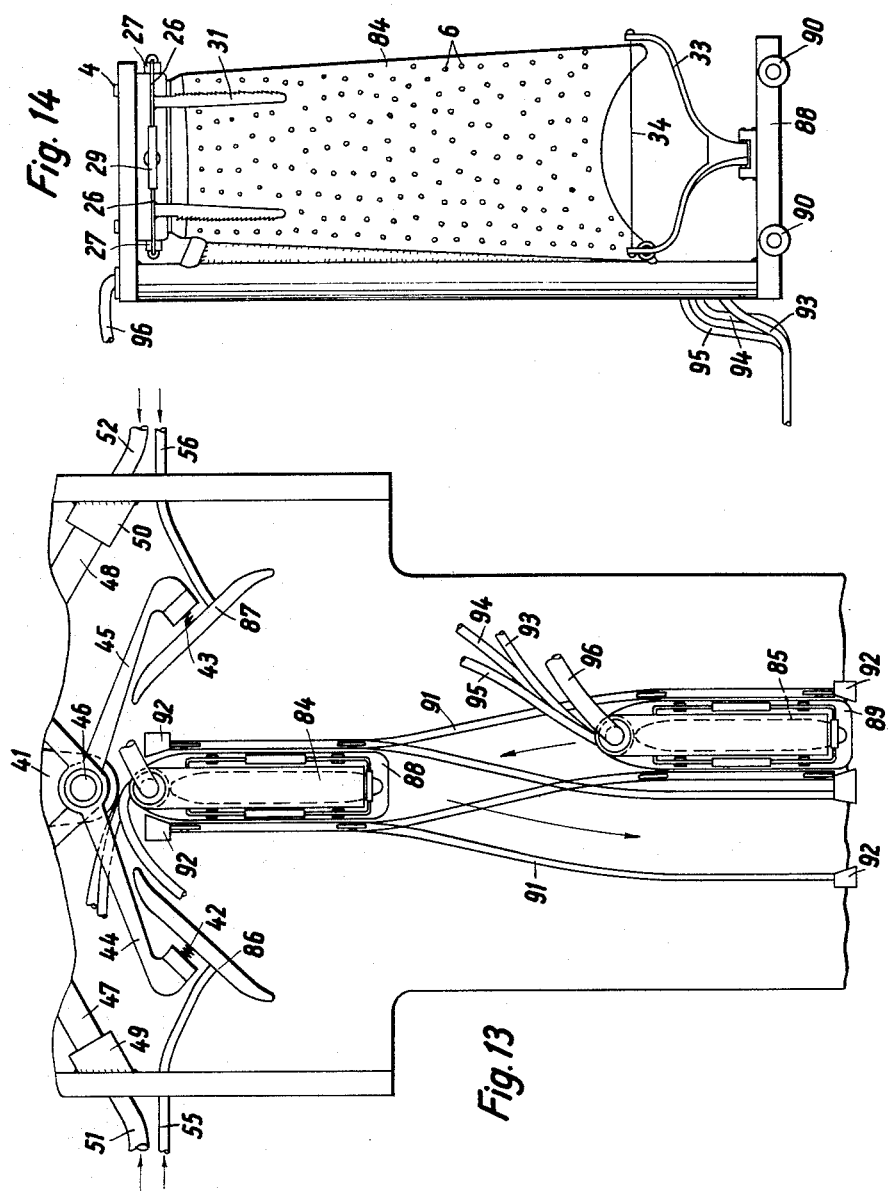

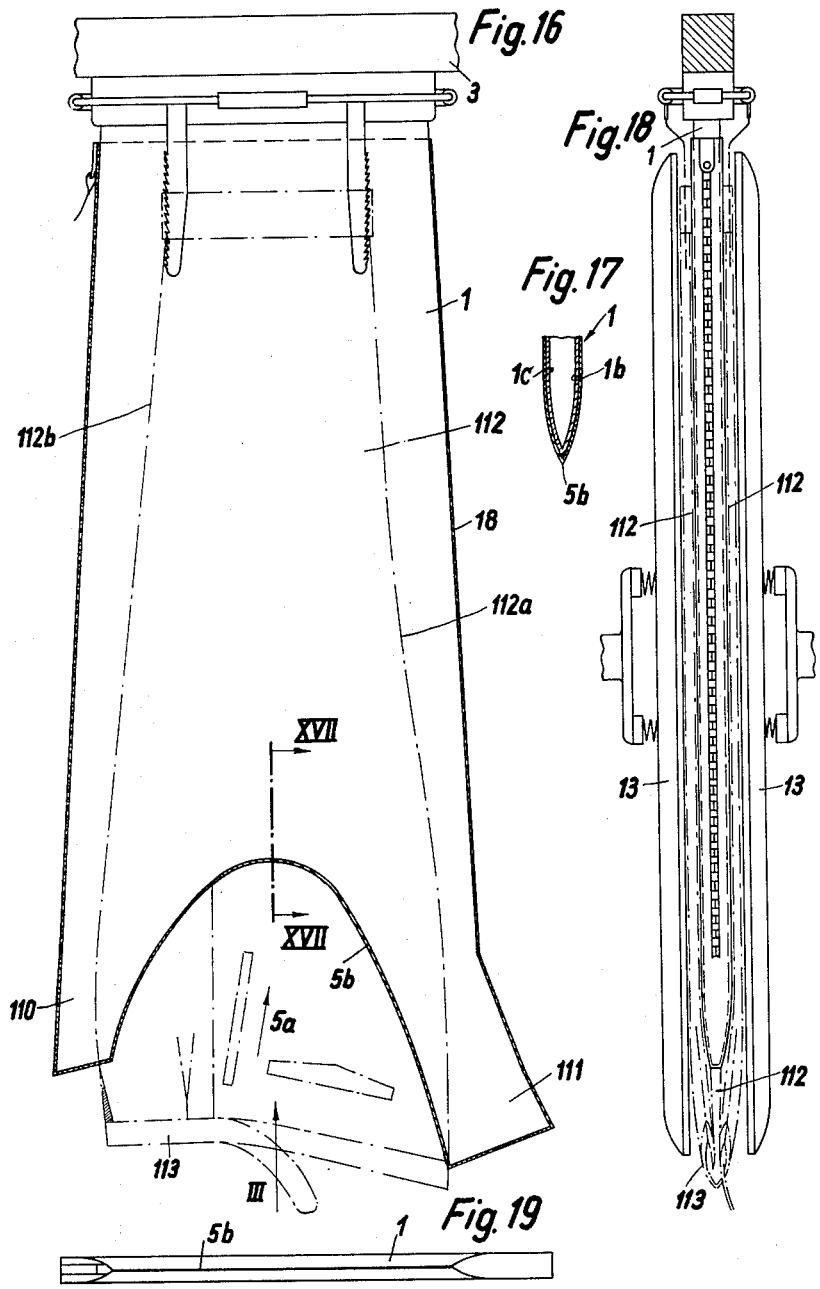

Sept. 28, 1965　　　M. ZIMMERMANN　　　3,208,652
TROUSER PRESSING APPARATUS
Filed Aug. 21, 1962　　　　　　　　　　　　　13 Sheets-Sheet 10
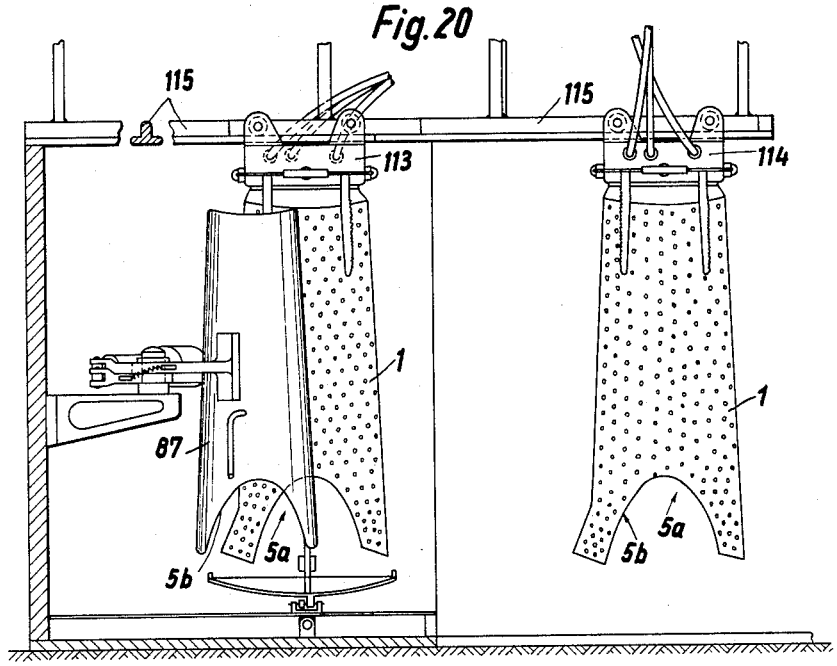
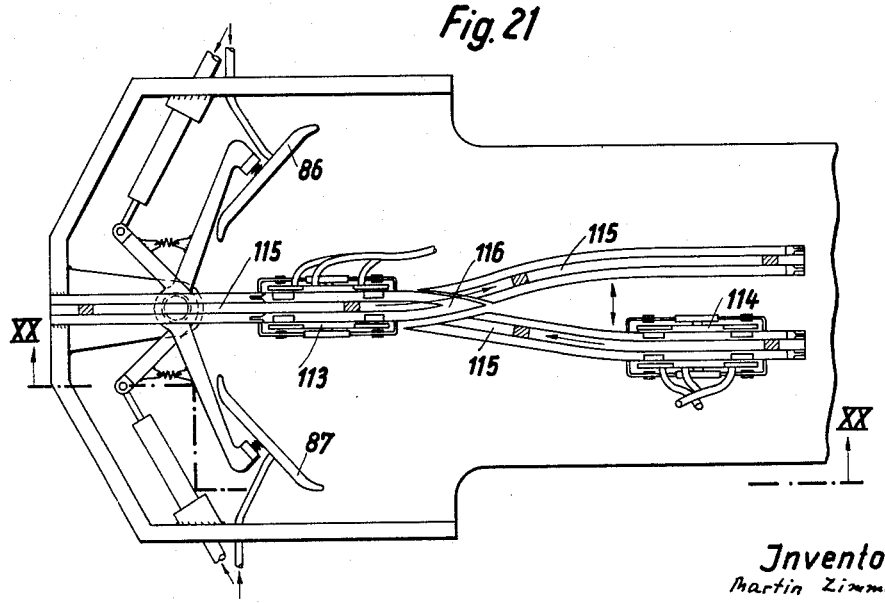
Inventor:
Martin Zimmermann
by
Michael S. Striker
Atty Sept. 28, 1965     M. ZIMMERMANN     3,208,652
TROUSER PRESSING APPARATUS
Filed Aug. 21, 1962     13 Sheets-Sheet 11

Inventor:
Martin Zimmermann
by Michael S. Striker

Inventor:
Martin Zimmermann
by Michael S. Striker

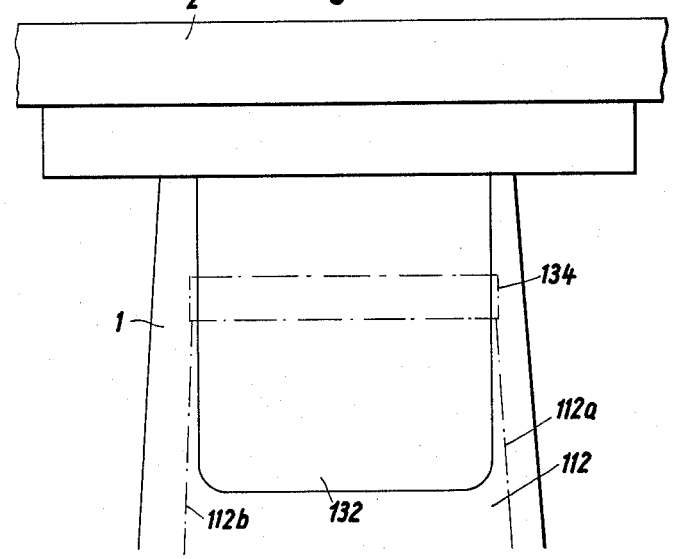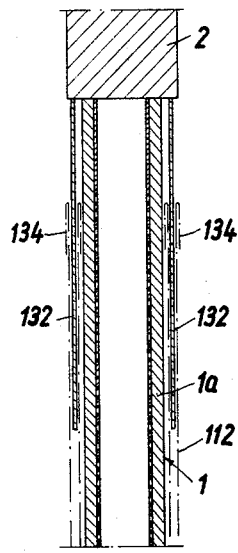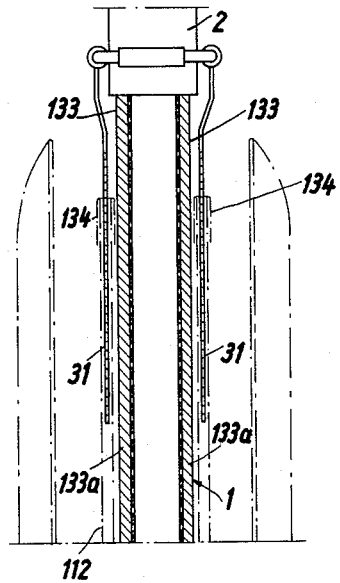

United States Patent Office

3,208,652
Patented Sept. 28, 1965

3,208,652
TROUSER PRESSING APPARATUS
Martin Zimmermann, Bremen, Germany, assignor to Heinrich Oelkers, Bremen, Germany
Filed Aug. 21, 1962, Ser. No. 218,320
Claims priority, application Germany, Aug. 26, 1961, Z 8,932
16 Claims. (Cl. 223—73)

The present invention relates to trouser-pressing apparatus.

In conventional apparatus for pressing trousers it is difficult to provide a relatively high output with a high quality pressing of the trousers. In particular, it is difficult with known apparatus to press the entire trousers particularly at the cuffs of the legs thereof and at the waist portion, and in addition undesirable creases are provided in the trousers during the pressing thereof.

It is accordingly a primary object of the present invention to provide a trouser-pressing apparatus capable of pressing the entire trousers including the cuffs at the ends of the legs thereof and the waist at the opposite end of the trousers.

It is furthermore an object of the present invention to provide a trouser-pressing apparatus which will enable a considerable part of the operations to take place automatically or at least with a minimum amount of operations on the part of the operator so that it will be possible for the operator to be active with activities other than the pressing itself during the actual pressing of a pair of trousers.

The objects of the present invention also include the provision of an apparatus wherein it becomes possible to place trousers on one form while a pair of trousers already placed on another form is being pressed, so that in this way almost continuous production can be achieved.

With these objects in view the invention includes, in a trouser-pressing apparatus, a form which is adapted to be located between the legs of the trousers and which at one end has a curvature conforming closely to the curvature of the crotch of the trousers, the cuffs of the trousers being located adjacent the opposite end of the form which is adapted to be vertically positioned with the cuffs of the trousers located adjacent the upper end of the form. The apparatus includes a pair of presser-plate units located on opposite sides of the form and adapted to move toward the same for pressing trousers thereon and away from the same so that trousers can be removed from and placed on the form, and in accordance with the present invention there are located on opposite sides of the form adjacent its upper end a pair of cuff-engaging means which respectively enter into the trouser legs at the cuff-ends thereof and engage the trouser legs at their cuff ends to position the trousers for receiving proper creases during the pressing operation and for also stretching the trousers along the legs thereof to maintain the trousers properly positioned on the form during the pressing thereof.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 3 is a sectional elevation of the structure of FIGS. 1 and 2, taken along line III—III of FIG. 2 in the direction of the arrows;

FIG. 4 is a partly sectional fragmentary elevation on an enlarged scale showing the manner in which an upper part of a form of the invention is constructed as well as showing structure for engaging the cuffs of the trouser legs;

FIG. 5 is a view of the structure of FIG. 4 as seen from the right of FIG. 4;

FIG. 6 is a sectional plan view of the structure of FIG. 4 taken along the line VI—VI of FIG. 4 in the direction of the arrows;

FIG. 7 is an elevational view of another embodiment of a structure according to the present invention, this embodiment including a plurality of forms each of which cooperates with a pair of presser-plate units;

FIG. 8 is a top plan view of the structure of FIG. 7;

FIG. 9 is a sectional elevation on an enlarged scale showing the rotary column of FIG. 7 and the conduit structure in the interior thereof;

FIG. 10 is a sectional plan view taken along line X—X of FIG. 9 in the direction of the arrows;

FIG. 11 is a fragmentary sectional view taken along line XI—XI of FIG. 8 in the direction of the arrows and showing the structure associated with the upper part of the rotary column of FIG. 7;

FIG. 12 is a sectional plan view taken along line XII—XII of FIG. 11 in the direction of the arrows;

FIG. 13 is a plan view of another embodiment of a structure which includes a plurality of forms which cooperate in succession with a pair of presser-plate units;

FIG. 14 is an elevation view of one of the movable forms of FIG. 13;

FIG. 15 is a fragmentary sectional view taken along line XV—XV of FIG. 7 in the direction of the arrows and showing the structure of the form and in particular the openings in the wall thereof;

FIG. 16 is a side elevational view of a form according to the invention, the trousers being shown in dot-dash lines in FIG. 16 and the form of FIG. 16 being suspended from its top end;

FIG. 17 is a fragmentary sectional view taken along line XVII—XVII of FIG. 16 in the direction of the arrows and showing the structure of the form at its bottom curved edge;

FIG. 18 is a view of the structure of FIG. 16 as seen from the right of FIG. 16, FIG. 18 showing in addition the presser-plate units as well as indicating trousers on the form;

FIG. 19 is an upwardly directed view of the bottom end of the form of FIG. 16, as seen in the direction of the arrow III of FIG. 16;

FIG. 20 is a side elevation of a further embodiment where a plurality of forms can be successively associated with the same pair of presser-units, FIG. 20 being taken along line XX—XX of FIG. 21 in the direction of the arrows;

FIG. 21 is a top plan view of the structure of FIG. 20;

FIG. 25 illustrates another embodiment of a structure for holding the trousers at the cuff-end of the leg thereof;

FIG. 26 is a longitudinal section of the structure of FIG. 25; and

FIG. 27 shows in section an embodiment of the padding which forms the outer covering for the form of the invention, the structure being shown in FIG. 27 when used with cuff-engaging elements.

Figure 1:
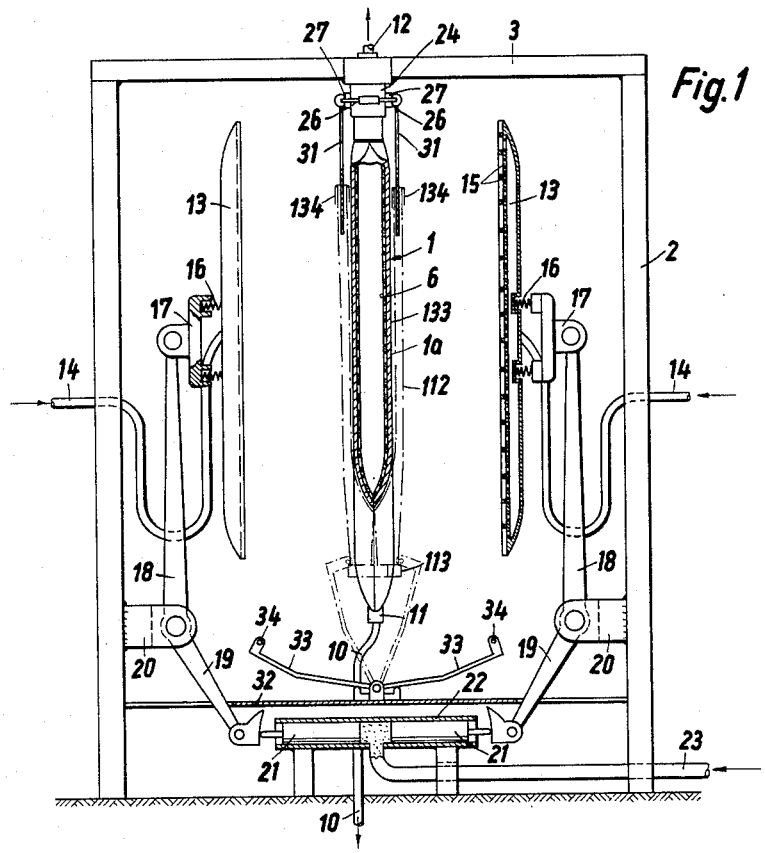
FIG. 1 shows in elevation a trouser-pressing apparatus according to the invention, the apparatus being shown in FIG. 1 partly in section so as to illustrate details of the structure.

In the embodiment of the invention which is illustrated in FIGS. 1–6b, the structure includes an elongated form 1 which is adapted to be located between the legs of a pair of trousers, as described below, and which is carried by a suitable frame. This frame includes the vertically extending members 2 which are fixed to and which carry a top wall 3 to which the form 1 is fixed by means of screws 4, the form 1 being elongated and extending vertically, as is shown in FIGS. 1 and 3. The form 1 is in the form of an elongated hollow body which is of a generally flat smooth configuration and which is slightly tapered, in the manner shown in FIG. 3, so that the form becomes gradually wider from the top toward the bottom, as is evident from FIG. 3. At its bottom end the form is provided with a recess 5a which is adapted to accommodate the crotch of the trousers while the legs of the trousers become located along the opposite sides of the form 1.

This form 1, which may be made of a material such as steel, aluminum, or the like, and which is provided in a known way with an exterior padding forming the covering 1a, has a plurality of openings 6 formed in its wall and passing therethrough so that steam, for example, which becomes located in the interior of the form can escape through the openings 6 and of course through the padding 1a. Such steam can be introduced into the interior of the hollow form in order to directly heat the same. The openings 6 are preferably inclined upwardly from the interior to the exterior of the wall of the form so that any condensate will drip down to the bottom of the form and will not drip to the exterior thereof, this feature of the invention being further referred to below in connection with FIG. 15.

A pipe 7 (FIGS. 3 and 4) communicates with the interior of the hollow form 1 and communicates also with an unillustrated source of steam so that the pipe 7 serves to direct to the interior of the form steam which is used for directly heating the same, and the steam introduced into the form through the top end thereof, as is particularly apparent from FIG. 4. Any suitable valve structure is carried by the conduit 7 so as to control the flow of the fluid therethrough. Moreover, there is located in the interior of the hollow form 1 a pipe 8 which is curved in the manner shown most clearly in FIG. 3 so as to have a plurality of loops, and this pipe 8 communicates at its top end with a pipe 9 which is also connected with a source of a hot fluid such as steam, and thus the hot fluid serves through the pipe 8 to heat the form 1 indirectly, and here again any suitable valve structure may be associated with the conduit 9 for controlling the flow of fluid therethrough and for thus controlling the heating provided by way of the pipe 8 in the interior of the hollow form. A pipe 10 is connected through a suitable fitting 11 to the lowermost part of the hollow interior of the form 1 so that condensate will discharge through the pipe 10. Furthermore, a pipe 12 communicates with the hollow interior of the form 1 adjacent the upper end thereof, and this pipe 12 is connected to a suitable vacuum pump or the like so that through the pipe 12 air can be evacuated from the interior of the hollow form to produce a suction. This suction may be used, for example, to remove dampness in the form of humid air or the like in the interior of the form during certain phases of the pressing process. Here again the conduit 12 will be provided, in the same way as the other conduits, with suitable valves and the like for controlling the flow of fluid therethrough.

Figure 2:
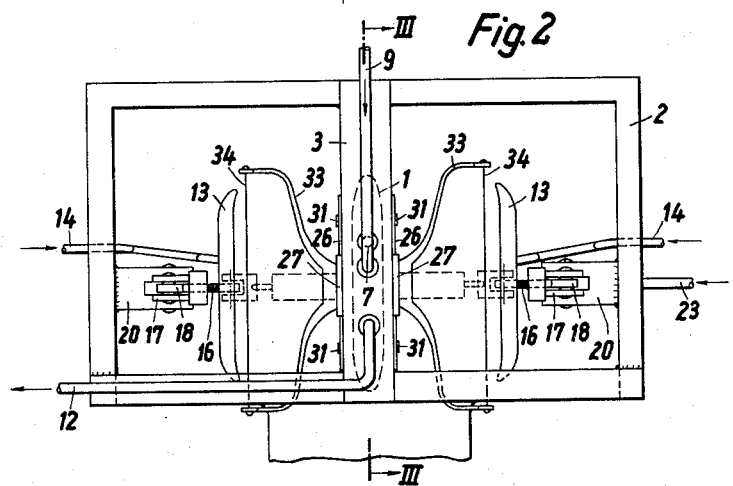
FIG. 2 is a top plan view of the structure of FIG. 1.

As is apparent from FIGS. 1 and 2, the form 1 is located between a pair of presser-plates units 13 each of which is also in the form of an elongated hollow body, and the units 13 are each substantially coextensive with the form 1 and movable toward and away from the form 1 to carry out the pressing of the trousers. Flexible conduits 14 respectively communicate with the hollow interiors of the units 13 for supplying steam thereto for directly heating the units 13. Moreover, at their faces which are directed toward the form 1 the units 13 are formed with openings 15 through which steam can escape from the hollow interior of the units to the exterior thereof, and these openings 15 are also inclined upwardly so that any condensate will collect at the bottom of the units 13 and will not flow out to the exterior of the faces thereof which engage the trousers. Suitable conduits, which are not illustrated in the drawing and which are also flexible, communicate with the bottom ends of the units 13 to receive the condensate and conduct it away from the units 13.

The walls of the units 13 which are directed away from the form 1 are fixedly connected with springs 16 through which these units are supported on members 17 which are in turn carried by levers 18 which are respectively pivotally supported by stationary brackets 20 carried by the frame 2 and these levers 18 respectively have arms 19 respectively connected pivotally with pistons 21 which are coaxial and slide in a common stationary cylinder 22, as shown in FIG. 1. Through a conduit 23 fluid under pressure, such as oil, for example, is directed to the interior of the cylinder 22 between the pistons 21 therein, and through the control of the flow of the fluid through the conduit 23 into and out of the cylinder 22 the movement of the pistons 21 and thus of the levers 18 and of the presser-plate units 13 is controlled. The pistons 21 always move through equal distances in opposite directions so that the presser-plate units 13 also always move equally toward and away from the form 1 and provide equal pressures on the trousers thereon. Instead of actuating the units 13 with a fluid-pressure medium, it is possible to use a mechanical structure in the form of a suitable toggle linkage located between and connected to the levers 18 for actuating the same to provide opposite and equal movements on the units 13. As a fluid medium for use in the cylinder 22 it is possible to use a suitable gas.

The units 13 are shown in FIG. 1 in their outer idle positions where they are spaced from the unit 1 so that the operator has free access thereto for mounting trousers on and removing trousers from the form 1, and in addition the pressure which acts on the units 13 can be adjusted.

The trousers are placed in an inverted position on the form 1 and the cuffs of the trouser legs which are thus located at the top end of the trousers are engaged by a structure of the invention which serves to hold the trousers on the form 1 without undesirably affecting the pressing of the trousers. Thus, the cuff-engaging means of the invention is relatively thin and enters into the interior of the trouser leg through the cuff thereof on each side of the form 1 to engage the trousers and maintain the latter on the form 1. In the illustrated example the cuff-engaging means takes the form of a pair of thin elongated strips or plates 31 located on each side of the form 1 at the upper end thereof.

FIG. 6 illustrates on an enlarged scale one example of a structure for carrying the cuff-engaging elements 31. The assembly for supporting the elements 31 is carried by a suitable carrier member 24 in the form of an elongated block interposed between the top wall 3 of the frame 2, 3 and the form 1, a sealing sheet 25 being interposed between the block 24 and the top end of the form 1. This elongated member 24 is formed with suitable openings through which the various conduits described above communicate with the interior of the form 1 and through which the pipe 9 communicates with the pipe 8, and of course the sealing member 25, which may be a suitable gasket, for example, is also formed with the required openings. The screw members 4 serve to connect the form 1 to the wall 3 with the element 24 interposed between the form 1 and the wall 3 so that these screws 4 also serve to support the carrier 24 in the position between the wall 3 and the form 1.

Four substantially L-shaped rods 26 are positioned in series one after the other in a manner shown in FIG. 6 so that they are located along a path which surrounds member 24, and these rods 26 all extend horizontally in the manner shown in FIG. 6. The carrier 24 is formed at its left and right ends, as viewed in FIG. 6, with bores which receive portions of substantially T-shaped tubular members 27 which receive the free ends of the shorter legs of the L-shaped rods 26, the members 27 being urged by springs 28 outwardly away from each other in the manner shown in FIG. 6, and also the shorter legs of the rods 26 are shiftable within the outer tubular portions of the members 27 so that the left pair of rods of FIG. 6 are shiftable toward each other as well as away from each other, and the same is true of the right pair of rods 26 of FIG. 6. Between its left and right ends, as viewed in FIG. 6, the carrier 24 is formed substantially centrally with a transverse bore receiving the legs of a pair of substantially T-shaped tubular members 29 urged apart from each other by a spring 30, as shown in FIG. 6, and the longer legs of the rods 26 are slidably received within the outer tubular portions of the members 29, and of course these longer legs of the four rods 26 fixedly carry the cuff-engaging elements 31, as indicated in FIG. 6. Therefore, with the structure shown in FIG. 6 the pairs of elements 31 which are respectively located on opposite sides of the form 1 are movable toward and away from the form 1, these elements moving toward the form 1 in opposition to the spring 30 and being urged away from the form 1 by the spring 30, and in addition each pair of elements 31 on a given side of the form 1 can move toward each other in opposition to the springs 28 which urge them apart from each other. Thus, with this arrangement on each side of the form 1 the pair of elements 31 can move toward and away from each other, and in addition the two pairs of elements 31 can be moved toward the opposed faces of the form 1. The cuff-engaging elements 31 are made of thin metal which is corrosion-resistant, or of a suitable plastic, and at their outer edges the elements 31 may have a saw-tooth configuration, as indicated in FIG. 4, so that these elements can in this way frictionally engage the trouser legs. Because of the extremely small thickness of the plates 31, when they extend within the trouser legs they will have no undesirable influence on the pressing of the trousers.

If desired, the springs 28 can be arranged in the tubular portions of the members 29 between the ends of the rods 26 to urge the latter to the right and left, as viewed in FIG. 6, apart from each other, and in the same way instead of the single spring 30 a pair of springs may be located within the tubular members 27 between the free ends of the shorter legs of the rods 26 to urge these rods apart from each other in a direction extending away from the opposed side faces of the form 1.

With this construction shown in FIGS. 4–6 the trouser leg at each side of the form 1 is moved at its cuff end upwardly onto a pair of the cuff-engaging elements 31 which are free to extend into the hollow interior of the trouser leg while pressing outwardly against the creases thereof so that elements 31 serve not only to hold the trousers on the form, stretching the trousers longitudinally so as to press the crotch thereof against the bottom edge of the form 1, but in addition the pressure derived from the spring 28 enables the elements 31 to tension each trouser leg horizontally in the direction of its width. The elements 31 may be introduced singly into the legs of the trousers so that first one element 31 on one side of the form 1 is introduced into the trouser leg and thereafter the other element 31 is introduced into the trouser leg, or both of the elements 31 on one side of the form 1 can be simultaneously introduced into the trouser leg.

With a pair of trousers thus engaged by the elements 31 the trousers hang downwardly thereform with the legs of the trousers respectively located on opposite sides of the form 1, and of course the weight of the trousers themselves cause them to hang freely down from the members 31. The operator pulls each trouser leg upwardly along the pair of elements 31 which extends into the interior of the trouser leg so that the crotch of the trousers becomes securely located against the lower curved edge of the form 1 and the trousers are in this way held under longitudinal tension.

Figure 6A:
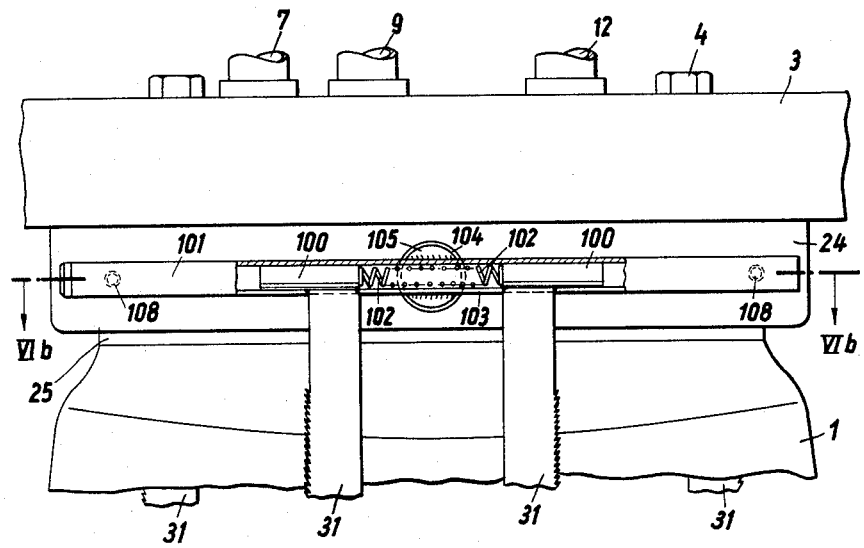
FIG. 6a is a fragmentary elevation showing again the upper portion of the form of the invention and the structure associated therewith, in particular the structure for engaging the cuffs of the trousers.
Figure 6B:
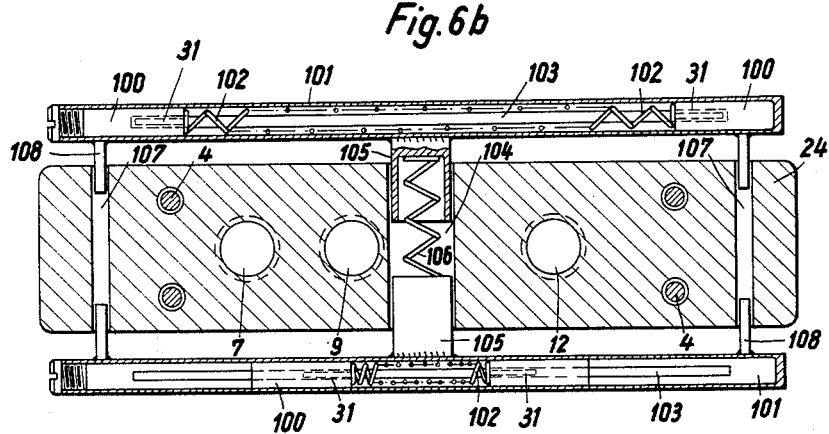
FIG. 6b is a sectional plan view taken along line VIb—VIb of FIG. 6a in the direction of the arrows.

Instead of the structure shown in FIGS. 4 and 6 and described above for supporting the trouser holding elements 31, it is possible to use the structure which is shown in FIGS. 6a and 6b. This embodiment also includes the carrier 24 which is interposed between the wall 3 and the form 1 with the gasket 25 between the form 1 and the carrier 24 and with the latter as well as the gasket 25 being formed with openings for the various conduits, as described above. With this embodiment the strips or plates 31 are fixedly connected at their upper ends to the horizontally extending pins 100, and these pins are slidably supported in tubes 101 for movement longitudinally thereof, these tubes 101 being respectively located on opposite sides of the carrier 24. At their undersides the tubes 101 are respectively formed with elongated slots 103 through which the strips 31 freely extend, while the pins 100 are freely movable along the interiors of the tubes 101. A spring 102 is located in each tube 101 between the pins 100 therein to urge these pins apart from each other and thus to urge the pair of members 31 apart from each other. The pair of members 31 nearest to the viewer of FIG. 6a, carried by the pair of pins 100 shown at the lower part of FIG. 6b, are located quite close to each other, while the other pair of members 31 are located relatively distant from each other, so that FIGS. 6a and 6b illustrate the range of movement of the elements 31 with this embodiment. The carrier 24 of this embodiment is also formed with a transverse central bore 104 in which is located a spring 106 which at its ends presses against the members 105 which are respectively fixed to and extend from the tubes 100 into the interior of the bore 104, so that this bore 104 serves to accommodate the extensions 105 and in this way support the tubes 101 on the carrier 24, and in addition the carrier 24 is formed with transverse bores 107 respectively receiving pins 108 which are fixed to the tubes 101, so that in this way the tubes 101 themselves are supported for movement toward and away from each other and the spring 106 urges them to the position illustrated in FIG. 6b. The springs 102 will urge the members 31 to the position where they are furthest from each other, as indicated at the upper part of FIG. 6b.

It should be noted that the spring 106 of FIG. 6b is shown in its fully expanded position so that the members 105 will not move outwardly of the bore 104 beyond the extent indicated in FIG. 6b, and thus the spring 106 will not cause the tubes 101 to fall from the carrier 24, but if desired any suitable means may be provided to limit outward movement of the tubes 101 away from the carrier 24. For example, the tubes 105 may be formed with longitudinal slots respectively receiving pins fixedly carried by the carrier 24 so that when the ends of these slots engage such pins the tubes 101 cannot move further away from the carrier 24.

In the same way, the springs 28 and 30 of FIG. 6 are shown in their fully expanded condition where they no longer urge the rods 26 outwardly away from each other, and in this way these rods 26 will remain in the position indicated in FIG. 6 and will not fall from the apparatus, but here again if desired any suitable means may be provided to limit the outward movement of the rods 26 away from each other, such as the use of a suitable pin-and-slot arrangement as indicated above for the embodiment of FIG. 6b.

In order to guarantee that the upper or waist end of the trousers lies smoothly against the lower end of the form 1, there is provided on each side of the form 1 beneath the latter a member 33 which is pivotally connected to the floor 32, in the manner shown in FIGS. 1 and 2, and this member 33 has the configuration of a bow and is connected at its ends to an elongated cord 34 which is stretched and may be made of nylon or the like, so that when the members 33 are swung upwardly the cords 34 will engage the trousers at the waist portion thereof and hold the trousers against the form 1.

The presser-plate units 13 are spaced from the form 1 when the parts are at rest. A pair of trousers which are to be pressed are placed on the form 1 with the latter extending between the legs of the trousers, a pair of trousers 112 being indicated diagrammatically in FIG. 1 on the form 1. It will be noted from FIG. 1 that the legs of the trousers are placed on the cuff-engaging elements 31 which extend into the interiors of the legs of the trousers and hold the latter in the manner described above, and furthermore the form 1 is located between the legs of the trousers with the waist 113 thereof hanging downwardly and located at the bottom end of the trousers. Each trouser leg is pulled upwardly along the elements 31 by the operator so that the trousers are in a longitudinally stretched condition on the form 1. The conduit 12 is initially opened so that the interior of the form 1 is placed at a pressure which is less than atmospheric pressure due to the suction provided through the conduit 12, and in this way the trousers are drawn toward and into engagement with the form 1 and are arranged in a positioned suitable for pressing, and of course the legs of the trousers will lie snugly up against the form 1. Then the conduit 12 is closed so as to terminate the suction and the conduit 7 is opened so that steam will flow into the interior of the form 1, and at the same time through the conduits 14 steam is delivered to the interior of the presser-plate units 13 which are also provided at their faces which are directed toward the form 1 with a suitable heading. As soon as a sufficient amount of steam has been introduced in this way into the form 1 and the units 13 the supply of steam through the conduits 7 and 14 is terminated, as by closing a suitable valve, and the units 13 are moved toward the unit 1 so as to press against the trousers and thus carry out the pressing operation, and the units 13 can be maintained in engagement with the trousers, pressing the latter against the form 1, for a period of 10 seconds, for example. Then the conduit 12 is again opened so as to subject the interior of the form to a suction, before the plates 13 are displaced away from the trousers, and in this way excessive humidity is removed from the trousers. Thereafter the plates 13 are moved away from the form 1 and the trousers are removed from the cuff-engaging elements 31 and the trousers have in this way been completely ironed all the way from the cuffs at the ends of the legs thereof to the waist. Of course, the conduit 12 is opened for only a short time and is then closed, the period of time being sufficient to remove excessive dampness, as was indicated above.

The closing and opening of the conduits 7 and 14 for directing steam into the units 1 and 13 as well as the conduit 12 to place the interior of the form 1 in communication with a suction source, and also the movement of the units 13 back and forth all can take place automatically according to a given cycle and according to a certain program which will maintain the various portions of the cycle in operation for given periods of time, and this automatic control may be brought about in a well known manner using known automatic timing devices, and in addition the force with which the units 13 are pressed against the trousers can be regulated.

The covering 1a carried by the form 1 at its exterior permits the steam to pass therethrough, but the structure of the paddling or covering 1a is such that the steam passing through the form must be very finely divided before it can pass all the way through the padding. The padding which forms the covering 1a of the form 1 has a configuration conforming thereto and thus tapers upwardly in accordance with the configuration of the form 1 as described above and as is shown in FIG. 3. In order to retain the covering on the form 1, the covering may be provided along one of its vertical edges with a suitable slide fastener, for example, or the top end of the covering may be pulled together with a suitable cord of plastic or the like which may then be knotted so as to keep the covering on the form. The covering 1a fits the form 1 in a very precise manner so that it will have a perfectly smooth condition free of any wrinkles and so that it will not slip with respect to the exterior surface of the wall of the form 1.

FIGS. 7–12 illustrate an embodiment of the invention which enables the output of the apparatus to be increased. This is brought about in general by providing a pair of forms which alternately cooperate with the presser-plate units. During the time that the operator is placing a pair of trousers on one of the forms, the second form which already has a pair of trousers thereon is located between the units 13 which are actuated to automatically carry out the pressing process, and when the pressing process is completed the form with the pressed trousers thereon is moved out of the space between the presser-plate units and the form with the unpressed trousers thereon is immediately moved into this space and the process is again repeated, the operator now removing the pressed trousers from the form which is not between the presser-plate units and replacing it with the next pair of trousers which are to be pressed, so that in this way although a single person operates the apparatus, as was the case with the embodiment of FIGS. 1–6, nevertheless the output is very high.

As may be seen from FIG. 7, this embodiment includes a pair of forms 35 and 36 whose construction is substantially identical with that of the form 1 described above. The forms 35 and 36 are located substantially in a common plane and are carried by a single rotary column 37 which is supported for rotation about its own axis, and the axis of this column 37 is located in the common plane in which the forms 35 and 36 are located, so that these forms are displaced by 180° with respect to each other about the axis of the column 37. The column 37 as well as the forms 35 and 36 are vertically positioned, and strips of sheet metal 38 or the like are located between and fastened to the column 37 and the forms 35 and 36, as by suitable weldments, so that in this way the forms 35 and 36 are fixedly connected with the column 37. The lower end portions of the strips 38 are indicated in FIG. 9. In the position of the parts shown in FIGS. 7 and 8 the form 36 is located between the pair of presser-plate units 39 and 40 each of which has a construction identical with the presser plate unit 13 described above. The frame which carries the apparatus includes a supporting bracket 41 (FIGS. 7 and 8) which serves to pivotally support the pair of units 39 and 40. Springs 42 and 43 are fixed respectively to the units 39 and 40 and are in turn carried by levers 44 and 45 which are turnably mounted on a common pivot 46 fixedly carried by the bracket 41, so that in this way the units 39 and 40 are supported for turning movement toward and away from each other. The movement of the presser-plate units 39 and 40 is brought about by a fluid-pressure means employing either a gas or a liquid, and this latter means includes the pair of stationary cylinders 47 and 48 which are respectively carried by the tubular supports 49 and 50 of the framework of the apparatus, and the pressure fluid is supplied to the cylinders 47 and 48 through the conduits 51 and 52, respectively, as was indicated most clearly in FIG. 8. Pistons within the cylinders 47 and 48 have their rods pivotally linked to the ends of the levers 44 and 45 which are distant from the units 39 and 40. These levers cross over each other so that it is the piston in the cylinder 48 which acts on the lever 44 to control the movement of the unit 39 while the piston in the cylinder 47 acts on the lever 45 to control the movement of the unit 40, and here again this movement is always brought about in such a way that the units 39 and 40 move equally but in opposite directions and can provide equal pressures on the opposite sides of the trousers which are mounted on the form which happens to be between the units 39 and 40. Flexible conduits 55 and 56 communicate with the interiors of the units 39 and 40 to supply steam directly thereto. Springs 53 and 54 are connected to the levers 44 and 45 in the manner shown in FIG. 8 and constantly urge the levers to turn to the illustrated position where the units 39 and 40 are in a rest position spaced from each other and permitting the movement of a form into and out of the space between the units 39 and 40. Thus, as soon as the pressure of the fluid in the cylinders 47 and 48 is released the springs 53 and 54 will act the levers 45 and 44 to turn them to the position illustrated in FIG. 8.

Each of the forms 35 and 36 is connected, with the interposition of a suitable gasket such as the gasket 25, to an elongated carrier 24 which carries through the rods 26 and the remaining structure described above and shown in FIGS. 4–6 the cuff-engaging means 31 which cooperates with each of the forms 35, 36 in exactly the same manner described above. Moreover, the column 37 carries at its bottom end a pair of supports each of which pivotally supports a pair of members 33 having the cords 34 mounted thereon for engaging the trousers at the lower, waist end thereof to hold the trousers snugly against the form during the pressing thereof, as described above.

The column 37 fixedly carries at its top end an elongated horizontal beam 57 to the underside of which the carrier members 24 are fixed, and the screws 4 shown in FIG. 7 extend through the beam 57 to be connected to the forms 35 and 36 to support the latter from the beam 57 in the same way that the form 1 is connected by the screws 4 to the wall 3. A portion of the column 37 extends through and beyond the beam 57 into a bearing 58 which is carried by the stationary framework so that in this way the column 37 is supported for rotary movement. Thus, as may be seen from FIG. 11, the beam 57 is formed with an opening through which a portion of the column 37 which is of reduced diameter extends into the bearing 58, and the beam 57 rests on an upwardly directed shoulder at the top end of the column 37. Furthermore, as is shown in FIG. 11, a suitable key and keyway serve to connect the beam 57 to the column 37 for rotary movement therewith. Referring to FIGS. 7 and 9, it will be seen that the column 37 rests at its bottom end on a base member 59 which supports the column 37 for rotary movement, and a suitable sealing ring 60 is located between the column 37 and the base 59, as shown in FIGS. 7 and 9. A gear 61 is fixed coaxially to the column 37 and a rack 62 meshes with the gear 61 and is adapted to move horizontally so as to reciprocate the column 37 back and forth through an angle of 180°, and in this way the positions of the forms 35 and 36 can be interchanged. The rack 62 is fixed to a piston which is slidable in a cylinder 64 to which fluid is supplied under presure through a conduit 63, this fluid being oil, water, compressed air, or the like, and in a manner well known in the art, the fluid-pressure means 64 cooperates with the rack 62 for periodically moving the latter first in one direction and in the opposite direction so as to interchange the positions of the forms 35 and 36.

The supply of steam for direct and indirect heating of the forms and the carrying-away of the condensate liquid as well as the source of suction are all connected to the interiors of the forms 35 and 36 through the interior of the column 37. As may be seen from FIGS. 7 and 9, a conduit 65 leads to the interior of the base 59, and this conduit is connected with a suitable source of steam, and the same is true of a conduit 66. This conduit 66 is connected with the pipe 8 in each form to provide the indirect heating thereof, while the steam which enters through the conduit 65 is released in the interior of the forms to provide the direct heating thereof. The condensate-discharge conduit 67 also passes through the base 59. On the other hand, the suction for drawing out the dampness of the interior of the forms 35 and 36 communicates with the latter through the top end of the column 37 where a conduit 68 communicates with the interior of the column 37 in a manner described below and shown in FIGS. 11 and 12. As may be seen from FIGS. 9 and 10, there is located within the column 37 a conduit 69 which is connected to the pair of pipes 8 whose loops are distributed along the interiors of the forms 35 and 36 in exactly the manner described above in connection with FIG. 6. The conduit 69 terminates at its bottom end in a pair of branches 70 and 71 which respectively communicate with a pair of free end portions of the conduit 66 in the end positions of the column 37, these end positions being provided by movement of the rack 62, as described above, so that when the column 37 is in the position of FIG. 9 or is displaced by 180° from this position the steam which enters through the conduit 66 will also pass through the branches 70 and 71 into the conduit 69 and from the latter into the pipes 8 in order to indirectly heat the forms. Thus, both of the forms 35 and 36 are indirectly heated irrespective of whether they are between the units 39 and 40 or in the position where the operator will remove one pair of trousers from a form and replace it with another pair.

Moreover, there are located within the column 37 a pair of conduits 72 and 73 which direct steam into the hollow interiors of the forms 36 and 35, respectively, as indicated in FIG. 9, and the conduit 65 has an upper end which in the position shown in FIG. 9, communicates with the conduit 72 through the opening 74 at the top end of the conduit 65. At this time the conduit 73 is closed. However, when the column 37 is turned through 180° to its other position then opening 74 will be in alignment with the bottom end of the conduit 73, and at this time the steam will be supplied directly to the interior of the forms 35, the steam being supplied in the position of the part shown in FIG. 9 shown directly into the interior of the form 36. Thus, the direct heating of the forms is carried out alternately. In the position of the parts shown in FIGS. 7 and 9, it is the form 36 which is located between the pair of presser-plate units 39 and 40, and thus it is only the form on which the pressing operations are taking place which is supplied directly with steam in its interior. The other form where the operator is removing a pair of pressed trousers and placing a pair of unpressed trousers thereon is not supplied directly with steam.

Furthermore, there are located within the column 37 a pair of conduits 75 and 76 which are respectively connected through suitable fittings 11 with the interiors 35 and 36 at the lowermost parts of these interiors, so that in this way the condensate both from the pipes 8 and from the interiors of the forms 35 and 36 will flow into the pipes 76 and 75, respectively. It will be noted from FIG. 9 that the conduit 67 has a pair of upper ends which respectively communicate with the conduits 75 and 76, so that irrespective of the angular position in which the column 37 is displaced by the rack 62 the conduits 75 and 76 will communicate with the conduit 67, so that the condensate will drain away from the apparatus both from the form where the pressing operation is taking place as well as from the form where the operator is removing a pressed pair of trousers and replacing it with an unpressed pair of trousers. The ends 77 and 78 of the conduit 67 which respectively communicate with the conduits 75 and 76 are indicated in FIG. 10. Thus, the indirect heating of the forms and the discharge of the condensate therefrom takes place substantially continuously. On the other hand, the direct steam is supplied to the interior of only that form which is in the pressing position between the presser-plate units 39 and 40.

Inasmuch as the application of suction to the interior of the forms takes place intermittently, a pair of conduits 79 and 80 respectively communicate with the interiors of the forms at their upper ends, as indicated in FIG. 11, and these conduits 79 and 80 which respectively communicate with the interiors of the forms 35 and 36 are capable of being alternately closed in a fully automatic manner. For this purpose a closure plug 81 (FIG. 11) is provided, this plug 81 closing the conduit 79 in the position of the parts indicated in FIGS. 11 and 12. The plug 81 is carried by a springy member 82 which urges the plug 81 outwardly away from the axis of the column 37. A rod which is fixed to the stationary bearing 58 is fixed at its bottom end to the spring 82 so as to carry the latter and support the plug 81 at the elevation of the top ends of the conduit 79 and 80, so that in this way the plug 81 remains stationary while the column 37 turns, and thus the conduits 79 and 80 will move into and out of engagement with the plug 81 during turning of the column 37. The arrangement is such that the suction will be applied only to that form which is not in the pressing position. In the position of the parts shown in FIG. 12 the form which communicates with the conduit 79 is in the pressing position between the units 39 and 40, and thus the suction will not be applied to this form but will be applied through the conduit 80 to the other form where the operator is removing the pressed trousers and replacing it with the unpressed trousers. Thus, with this arrangement as soon as the structure has been turned to a position placing one of the forms in the pressing position between the units 39 and 40 so that steam will be delivered to the hollow interior thereof the interior is closed off by the plug 81 so that the suction will not communicate with the interior of the form which is being supplied with steam and which is in the pressing position, while as soon as a form moves into the other position after completion of the pressing operation the suction immediately communicates with the interior thereof to remove all excessive humidity therefrom as soon as the pressing operation is completed.

Although the above-described structure includes only a pair of forms 35 and 36 displaced by 180° with respect to each other, it is of course also possible to provide four forms displaced by 90° with respect to each other and serviced through suitable conduits as described above. It is possible to arrange corresponding to the beam 57 and extending at 90° thereto and capable of supporting a pair of additional forms in this manner, so that if desired there can be four forms which are successively moved to the operating position between the pair of units 39 and 40.

In the embodiment of the invention which is illustrated in FIGS. 13 and 14, the apparatus includes a pair of forms 84 and 85 which are adapted alternately to cooperate with a pair of presser-plate units 86 and 87 having a construction identical with that described above. The forms 84 and 85 are respectively carried by carriages 88 and 89 each of which is provided with wheels 90 which rest on and are guided by tracks which include a switch and which are so formed that one of the forms can be moved into a pressing position between the units 86 and 87 while the other carriage and the form thereon is positioned beyond the range of the units 86 and 87 so that, for example, with the position of the parts shown in FIG. 13 a previously pressed pair of trousers can be removed from the form 85 which can then have a pair of trousers which are to be pressed placed thereon, and simultaneously a pair of trousers which has already been placed on the form 84 can be pressed by movement of the units 86 and 87 against the trousers on the form 84, and of course the forms 84 and 85 may then have their positions changed so that the form 84 is moved by its supporting carriage 88 to a position at the end of the left pair of tracks 91 out of the space between the units 86 and 87 and the carriage 89 can then be moved into this latter space to place the form 85 in a pressing position. The tracks 91 are provided where they cross each other with a suitable switch which is of known structure enabling the operator to direct the forms to the proper tracks. At their outer ends distant from the presser-plate units 86 and 87, the tracks 91 carries stops 92 which limit the movement of the carriages so that they cannot move from the tracks. With this embodiment the supply of steam for directly heating the interior of the forms 84 and 85 from the carriages 88 and 89, as well as the supply of steam for indirectly heating the forms and the carrying away of the condensate from the lower ends of the forms are brought about for each of the forms through the flexible hoses or conduits 93, 94 and 95. The sucking of the damp air from the interior of the forms 84 and 85 is brought about by a conduit 96, also in the form of a flexible hose, and communicating with the interior of the top end of each form 84 and 85.

Referring now to FIG. 15, the structure of a form of the invention is shown fragmentarily on an enlarged scale and in section. Thus, it will be seen that the form 97, which can be identical with any of the above-described forms, has in its interior the pipe 98 which corresponds to the pipe 8 and which is coiled so as to have loops as described above, this pipe 98 being provided with steam so as to indirectly heat the form. The wall of the form is provided with openings 99 each of which is inclined upwardly from the interior toward the exterior face of the wall of the form, as clearly shown in FIG. 15, so that with this construction any condensate will drop down along the interior of the form, and this feature is included in all embodiments of the invention.

Inasmuch as the forms are supplied interchangeably to the apparatus, the apparatus can be provided with particular forms which are particularly suited to the particular articles which are to pressed.

The turning on and shutting off of the supply of steam for direct heating of the forms, and the suction as well as the carrying out of the pressing process can all be controlled from suitable foot pedals and/or by hand through the manipulation of suitable control elements such as levers, keys, buttons, or the like which are manipulated by the operator. Moreover, the control elements can be so interrelated that it is impossible to operate certain elements simultaneously, and thus with such an arrangement it is possible to realiably prevent steam which is directly supplied to the interior of the form and the presser-plate units to escape therefrom when the form is not in a pressing position.

A further control is provided for adjusting the pressure with which the presser-plate units press against the trousers on the intermediate form.

The control member for the supply of direct steam to the interior of the forms as well as to the interior of the pressure-plate units in order to supply steam to the trousers or the like, the control member for the suction which removes the dampness from the pressed article, and the control for the movement of the pressure-plate units as well for providing the desired pressure can all be automatically controlled, for example, by means of an electrical or mechanical programing structure well known in the art, so that the actual pressing process can take place in a fully automatic manner.

The form 1 shown in FIGS. 16–19 is made up of a pair of plates 1a and 1b having a thickness on the order of 3 cm. and shaped so as to provide the generally flat form 1 with the hollow interior space. The form is attached to the wall 3 of the frame in the manner described above. The lower space 5a at the bottom end of the form is defined by the edge 5b thereof, and the curvature of this edge 5b conforms very closely to the curvature of the crotch of the pair of trousers. As is shown in FIG. 16, the space 5a is defined by a pair of extensions 110 and 111 which form the bottom end of the form 1 and which extend all the way up to the waist 113 of the trousers so that in this way the pressing operations take place over the entire length of the trousers. As may be seen particularly from FIG. 17 the plates 1c and 1b are curved in the region of their edges which join each other to form the edge 5b of the form, so that in the region of this edge the form has a substantially V-shaped cross section providing it with a tapered configuration along the edge 5b and enabling the form in this way to conform very closely to the proper configuration for the trousers at the crotch thereof.

In this way the precise location of the crotch of the trousers 112 precisely along the edge 5b is guaranteed. Moreover, the portion of the trousers adjacent the crotch thereof will lie smoothly in a wrinkle-free manner against the exterior surface of the form and during the pressing operation the presser plate units 13 will apply pressure of the trousers against the form in such a manner that an exact pressing of the trousers 112 over the entire length thereof providing precise front and rear creases 112a and 112b, respectively, extending all the way from the cuffs of the legs to the waist 13 is guaranteed, as is particularly apparent from FIGS. 16 and 18, the latter indicating the cooperation between the presser plate units 13 and the form 1. FIG. 16 shows along the left edge of the form a slide fastener for the covering thereof, this slide fastener also being evident in FIG. 18 which shows the structure of FIG. 16 as seen from the left thereof.

The embodiment of the invention which is illustrated in FIGS. 20 and 21 is similar to that of FIGS. 13 and 14, except that instead of providing tracks on the floor in order to support carriages 88 and 89, the embodiment of FIGS. 20 and 21 provides upper carriages 113 and 114 which ride on overhead tracks from which the forms 1 are suspended in the manner shown in FIG. 20. These overhead tracks are in the form of T-beams 115 supported in any suitable way from the ceiling of the room and having a bottom horizontal web the outer flanges of which engage the underside of rollers carried by the carriages 113 and 114, as indicated in FIG. 20.

Of course, as is evident from FIG. 13, the pair of pressure-plate units 86 and 87 are supported in exactly the same way as and are actuated in exactly the same way as the pressure-plate units 39 and 40 of FIG. 8, and the various elements for actuating the units 86 and 87 are shown in FIG. 13 with the same reference characters as in FIG. 8, and in the same way the units 86 and 87 of FIG. 21, as well as FIG. 20, are supported and actuated, so that this structure is not further described.

In the position of the parts shown in FIGS. 20 and 21, it is the form 1 which is carried by the carriage 113 which is in the pressing position between the pressure-plate 86 and 87 which operate in exactly the same way on whichever one of the forms seem to be in the pressing position. The other form 1, which is carried by the carriage 114, is located beyond the range of the pressure-plate units and can be serviced by the operator who removes the pressed trousers therefrom and mounts thereon an unpressed pair of trousers. With the arrangements shown in FIGS. 20 and 21 the entire floor area is available to the attendant who is operating the apparatus so that tracks such as those of FIG. 13 are not likely to interfere with the movements of the operator.

As is shown in FIG. 21 a switching element 116 in the form of a movable intermediate part of the rail 115 can be moved between the position shown in FIG. 21 where it forms a continuation of the left part of the rail 115 with the upper right part thereof of FIG. 21 to a position where it forms a continuation between the left part of the rail 115 of the FIG. 21 and the lower right portion of the rail 115 of FIG. 21, so that in this way the operator can direct the carriage 113 from the pressing position to the upper right rail 115 of FIG. 21 with the switch portion 116 in the position of FIG. 21, while when the form carried by the carriage 114 is in the pressing position, the switch 116 will be in its other position providing a connection with the lower right portion of the rail 115 and thus it is possible for the operator to direct the carriages to the proper rails without any interferences between the carriages and the forms carried thereby.

In the embodiment of FIGS. 20 and 21 flexible conduits communicate with the interior of each form 1 through the carriage which carries the same, in the same way that the conduits 93–96 of FIGS. 13 and 14, so as to supply the necessary steam and vacuum as described above.

Figure 22:
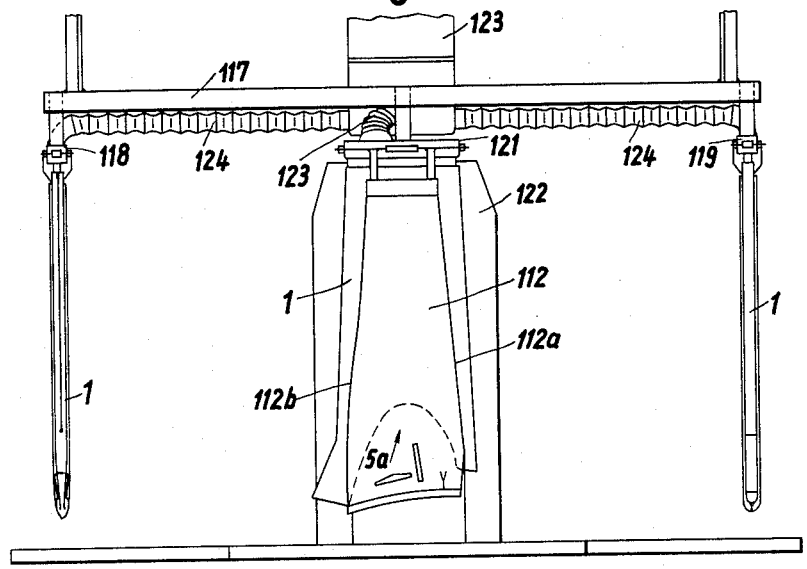
FIG. 22 is an elevational view of another embodiment of an apparatus where a plurality of forms successively cooperate with a pair of presser-plate units.
Figure 23:
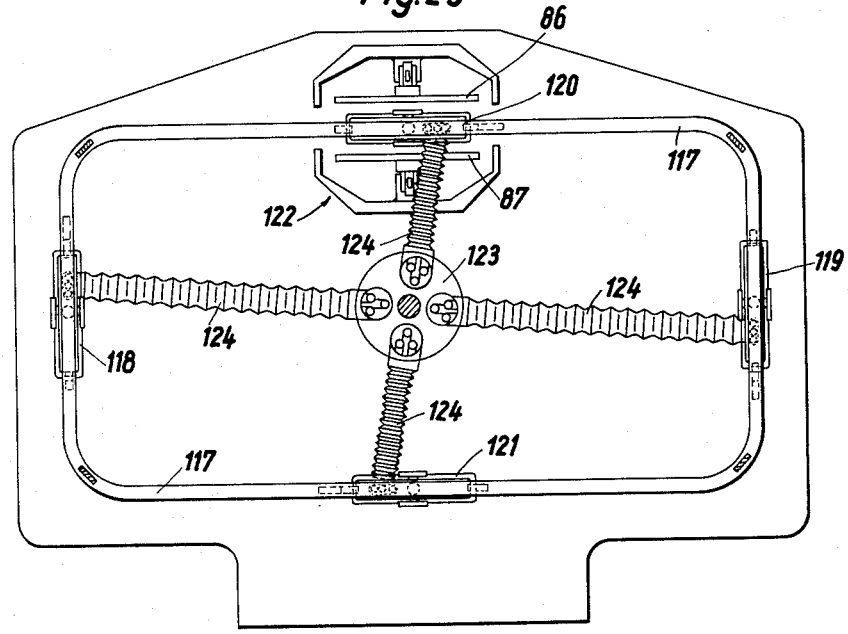
FIG. 23 is a plan view of the structure of FIG. 22.

In the embodiment of FIGS. 22 and 23 the several forms 1 are also suspended from carriages. However, with this embodiment the track is in the form of a single endless track 117 on which four carriages 118, 119, 120, 121 are supported for movement in the same way that the carriages 113 and 114 are supported by the track 115. The carriages 118–121 are maintained equidistant from each other along their path of movement defined by the endless track 117. A suitable means such as an endless belt, chain, or the like is connected to the several carriages so that movement of one carriage will be transmitted to all of the others and therefore through pulling on such an endless belt, chain or the like all of the carriages will necessarily move together.

On opposite sides of the path of movement of the forms 1 which are respectively carried by the carriages is located a pair of pressure-plate units 86 and 87 within a suitable enclosure 122 through which the forms 1 successively pass. A control structure is operatively connected to the structure of FIGS. 22 and 23, such as to the carriages thereof for moving the carriages at given intervals through a distance sufficient to displace one form out of the pressing position between the units 86 and 87 and to displace the next form into this space, the structure moving the carriages in only a single direction, so that in this way while pressing a pair of trousers is taking place the remaining three forms are accessible to the operator who can arrange thereon trousers to be pressed while removing from the form which has just been displaced from the pressing position the freshly pressed pair of trousers.

As is indicated diagrammatically in FIG. 23, the supply of steam and suction to the several forms takes place through a central pipe system 123 from which extend flexible contractable and extendable conduits 124 to the several forms 1. A set of three conduits communicates with each one of the flexible conduits 124, these three conduits providing, respectively, direct steam heating, indirect steam heating, and suction, as described above.

As has also been described above, each of the forms is provided with a padding in the form of a foam plastic or the like through which the steam can pass, and the same is of course true of the pressure-plate units 86, 87.

Figure 24:
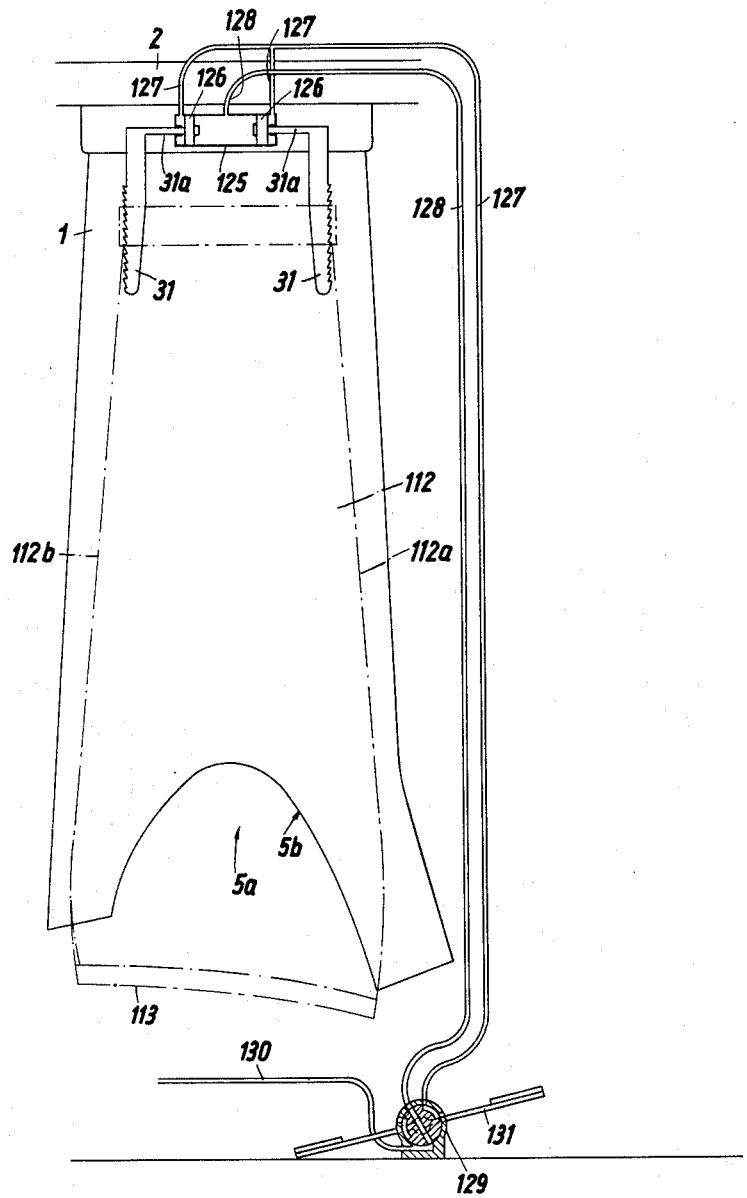
FIG. 24 is an elevation of a structure which can have the cuff-engaging elements operated by fluid pressure in response to actuation of the valve by the operator.

FIG. 24 shows another embodiment of a structure for actuating the cuff-engaging means 31. As may be seen from FIG. 24, each cuff-engaging element 31, these elements being arranged with one pair on each side of the form 1, as described above, has an arm 31a fixed to and extending from a piston 126, and on each side of the form is located a cylinder 125 in which a pair of the pistons 126 are slidable, as indicated in FIG. 24, the extensions or piston rods 31a extending in a fluid-tight manner through the end walls of the cylinder 125. A pressure conduit 127 terminates in a pair of branches which respectively communicate with the interior of the cylinder 125 adjacent its end walls at points between which the pistons 126 are always located, so that in this way the fluid from the conduit 127 will always cooperate with those faces of the pistons 126 which are directed away from each other, and an additional pressure conduit 128 communicates with the interior of the cylinder 125 between the pistons 126 so that the fluid in the conduit 128 will always communicate with those faces of the pistons 126 which are directed toward each other. These conduits 127 and 128 are connected to a multiple-way valve 129 which communicates with a conduit 130 from which fluid under pressure is derived. In the illustrated example the fluid is air so that the fluid can be permitted simply to discharge to the outer atmosphere. A foot-lever 131 is connected to the valve 129 so that the operator can turn the lever 131 to position the valve in one position for spreading the elements 31 from each other on each side of the form 1, and in the other position the elements will move together so that the trousers can be removed. It will be seen that in the position of the valve 29 shown in FIG. 24 air from a suitable tank is delivered through the conduit 130 and the valve 129 under pressure into the conduit 128 from where the fluid flows into the cylinder 125 between the pistons 126 to spread the latter and press the elements 31 apart from each other so that the trousers will be reliably held with the valve 129 and the lever 131 in the position shown in FIG. 24, and at this time the conduit 127 communicates with the outer atmosphere through a suitable passage in the rotary valve member and the outer housing of the valve, as is apparent from FIG. 24, while when the lever 131 is turned so that its right end, as viewed in FIG. 24, engages the floor, then the fluid under pressure will flow into the conduit 127 so as to move the pistons 126 and thus the cuff-engaging elements 31 toward each other to release the trousers, and at this time the conduit 128 will communicate with the outer atmosphere through a second passage of the rotary valve member and a second discharge opening of the valve housing, as indicated in FIG. 24. Thus, with this embodiment it is a simple matter to operate the elements 31 so as to place the trouser legs thereon and remove the trousers legs therefrom.

It is also possible to hang the trouser legs on cuff-engaging elements which do not include a pair of members which are required to be moved apart from and toward each other, and such a construction is shown in FIGS. 25 and 26 where the cuff-engaging means at the upper region of the form is adapted to extend into the trouser leg through the cuff portion thereof and is in the form of a plate 132 through which air cannot pass, this plate having a width corresponding approximately to the width of the trouser leg and being relatively thin so that it will not interfere with the pressing operation, the plate 132 being made, for example, of sheet, steel, plastic, or the like.

The trouser legs are drawn against the form as a result of the partial vacuum induced by the suction. Inasmuch as the materials which are located between the interior and exterior of the form 1 are capable of having air passed therethrough, it may happen that the trouser legs, particularly at the upper cuff portions thereof are not reliably drawn against the form, and with this embodiment where the cuff-engaging plates 132 are impermeable to air, these plates will be reliably drawn against the form to press the trousers, particularly at their cuff portions, against the form and thus increase the efficiency of the pressing operation. The plates 132 can be made of a springy sheet steel so that they can yield, or they can be swingably connected at their top ends to the upper wall of the supporting frame. It is also possible, however, to arrange the plates 132 so that they are shiftable laterally with respect to the form and with such an arrangement they can be under spring pressure or they can also be mechanically situated.

In actual practice, the springy embodiment of the plates 132 will suffice in order to provide a convenient upward stretching of the trousers through these plates.

In the embodiment of FIG. 27, the form 1 is provided with an outer covering 133 in the form of a yieldable padding having different degrees of hardness. In particular, this padding, which is made of a heat-resistant foam plastic, such as silicon, foam rubber, or the like, is formed in such a way that in the upper region of the form, which is to say in the region of the trouser cuffs 134, the plastic is softer and therefore more easily yieldable than at the padding surfaces 133a. Thus, the cuffs, which provide a thicker part of the trousers, can press more easily into the padding to provide an efficient pressing of the trousers at the cuffs thereof. The trousers with this embodiment can be held either by the cuff-engaging means 31 or by the cuff-engaging means 132.

With this embodiment also the upwardly directed trouser legs will terminate in the region of the upper portion of the pressure-plate units 13.

It will be understood that each of the elements described above or two or more together, may also find a useful application in other types of pressing apparatus differing from the types described above.

While the invention has been illustrated and described as embodied in trouser pressing apparatus, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a trouser-pressing apparatus, in combination, a pair of presser-plate units between which a pair of trousers is adapted to be pressed; and an intermediate form having an upper portion and a lower portion located between said units and adapted to be placed between the legs of a pair of trousers placed thereon in inverted position for supporting the same during pressing thereof when said units move toward said form, the legs of the trousers extending upwardly along opposite sides of said upper portion and the crotch of the trousers being maintained against said lower portion, whereby said lower portion is enveloped by the trousers which extend in part below said lower portion, said form including an inner member and an outer covering located on said inner member, said covering being formed from a yieldable foam plastic having different degrees of hardness, said foam plastic being softer at the portion of the form where the cuffs of the trouser legs are located than at other portions of the form so that the covering will yield more readily at the greater thickness of the trousers at the cuffs thereof.

2. In a trouser-pressing apparatus, in combination, an intermediate elongated form having an upper portion and a second portion located below said upper portion, said form being adapted to be located between the legs of a pair of trousers, said second portion having a curvature corresponding to the crotch of a pair of trousers and said form providing a support for the trousers all the way from the cuffs of the legs thereof approximately up to the waist of the trousers, and comprising means for holding the trouser legs in properly creased and longitudinally stretched condition in an inverted position so that the legs of the trousers extend upwardly along opposite sides of said upper portion and the crotch of the trousers is maintained against said second portion, whereby said second portion is enveloped by the trousers which extend in part below said second portion; a pair of outer elongated presser units adapted to move toward and away from each other in order to press and release, respectively, a pair of trousers in the space therebetween; and guide means engaging the upper portion of said elongated form and adapted to guide said form for movement with a pair of trousers thereon between a loading position entirely outside of said space between said presser plate units and a pressing position located within said space between said presser plate units so that the latter can be operated to press the trousers when said form is in said pressing position.

3. In a trouser pressing apparatus, in combination, an elongated substantially vertical intermediate form having an upper end and a second end located below said upper end and conforming to the curvature of a crotch of a pair of trousers and extending substantially to the waist of a pair of trousers with the remainder of the form extending between the legs of a pair of trousers which are placed in inverted condition on the form; a pair of elongated presser plate units adapted to be moved toward each other in order to press a pair of trousers in the space therebetween and away from each other to release the pair of trousers; guide means engaging the upper end portion of said elongated form and adapted to guide said form for movement between a loading position located entirely outside of said space between said presser plate units and a pressing position located within said space so that when said form with trousers thereon is in said space between said units the latter can be operated to press the trousers; a pair of elongated, thin, cuff engaging elements located at each side of said form adjacent the upper end thereof and each having a lower cuff engaging portion located in the space between said intermediate form and said presser plate units, respectively, and adapted to enter into the legs of a pair of trousers at the cuff ends thereof for engaging the trousers at the creases thereof and for longitudinally stretching the legs of the trousers to maintain the crotch thereof against the second end of the intermediate form preparatory to pressing the trousers, whereby said second end is enveloped by the trousers.

4. In a trouser-pressing apparatus, in combination, a pair of elongated presser-plate units adapted to be moved toward each other in order to press a pair of trousers in the space therebetween and away from each other to release the pair of trousers; a plurality of elongated forms each having an upper portion and a second portion located below said upper portion and each adapted to be placed between the legs of a pair of trousers and arranged to support such trousers in an inverted position during pressing substantially from the waist to the cuffs thereof with the trouser legs extending upwardly along opposite sides of said upper portion of the crotch engaging said lower portion; and guide means engaging the upper portion of each of said elongated forms and adapted to guide each form for movement between a loading position located entirely outside of said space between said presser plate units and a pressing position located within said space so that while one form with a pair of trousers thereon is in said pressing position between said units the latter can be operated to press the trousers and when said forms are in said loading position trousers can be mounted thereon in inverted position.

5. In a trouser-pressing apparatus, in combination, a plurality of intermediate elongated forms each having an upper portion and a second portion below said upper portion and each adapted to be located between the legs of a pair of trousers, said second portion having a curvature corresponding to that of the crotch of a pair of trousers and each of said forms providing a support for the trousers all the way from the cuffs of the legs thereof approximately up to the waist of the trousers and comprising means for holding the trouser legs in properly creased and longitudinally stretched condition in an inverted position so that the legs of the trousers extend upwardly along opposite sides of said upper portion and the crotch of the trousers is maintained against said second portion, whereby said second portion is enveloped by the trousers which extend in part below said second portion; a pair of outer elongated presser-plate units adapted to move toward and away from each other in order to press and release, respectively, a pair of trousers in the space therebetween; guide means engaging the upper portion of each of said elongated forms and adapted to guide each of said forms for movement with a pair of trousers thereon between a loading position located entirely outside of said space between said presser plate units and a pressing position located within said space so that while one form with a pair of trousers thereon is in said pressing position between said units the latter can be operated to press the trousers while another form which is not between the units can have a pair of trousers placed thereon preparatory to being moved into the space between said units when the form therein is removed therefrom with a pair of pressed trousers thereon.

6. In a trouser-pressing apparatus, in combination, a plurality of elongated substantially vertical intermediate forms each having an upper end portion and a second end portion located below said upper end portion, said second end portion conforming to the curvature of the crotch of a pair of trousers and extending with its end substantially to the waist of a pair of trousers with the remainder of the form extending between the legs of a pair of trousers which are placed in inverted condition on the form; a pair of elongated presser plate units adapted to be moved toward each other in order to press a pair of trousers in the space therebetween and away from each other to release the pair of trousers; movable support means arranged to engage the upper end portion of each of said forms for supporting each of said forms for movement with a pair of trousers thereon between a loading position located entirely outside of said space between said presser plate units and a pressing position located within said space so that while one form with the pair of trousers thereon is in said pressing position between said units the latter can be operated to press the trousers while another form which is not between the units can have a pair of trousers placed thereon preparatory to being moved into the space between said units when the form therein is removed therefrom with a pair of pressed trousers thereon, said forms extending downwardly from said support means; a pair of elongated, thin, cuff engaging elements located on each side of each form adjacent the upper end thereof and each having a lower cuff engaging portion located in the space between the respective intermediate forms and said presser plate units when that form is in the space between said presser-plate units, and adapted to enter into the legs of a pair of trousers at the cuff ends thereof for engaging the trousers at the creases thereof and for longitudinally stretching the legs of the trousers to maintain the crotch thereof against second end portion of the intermediate form preparatory to pressing the trousers, whereby said second end portion is enveloped by the trousers which extend in part below said second end portion.

7. In a trouser pressing apparatus, in combination, a pair of elongated presser plate units adapted to be moved towards each other in order to press a pair of trousers in the space therebetween and away from each other to release said pair of trousers; an elongated form having an upper portion and a lower portion and adapted to be placed between the legs of a pair of trousers so as to support such trousers in an inverted position during pressing, with the trouser legs extending upwardly along opposite sides of said upper portion and the crotch of the trousers engaging said lower portion; and guide means engaging the upper portion of said elongated form and adapted to guide said form for movement between a loading position located entirely outside of said space between said presser plate units and a pressing position located within said space so that a pair of trousers can be mounted on said elongated form in inverted position while said form is in said loading position thereof and said presser plate units may be moved toward each other for pressing said trousers while said form with said trousers mounted thereon is in said pressing position thereof.

8. The combination set forth in claim 4, wherein said guide means comprise rotary support means for supporting said plurality of forms for movement in a circular path between at least one loading position located entirely outside of said space between said presser plate units and a pressing position located within said space.

9. The combination set forth in claim 4, wherein said guide means include endless track means for supporting said forms for movement along an endless path one after the other between at least one loading position located entirely outside of said space between said presser plate units and a pressing position located within said space.

10. The combination set forth in claim 7 further comprising holding means movable toward and away from said form adjacent to the bottom end thereof and beyond the range of said presser plate units when said form is in said pressing position, for holding the trousers adjacent the waist thereof.

11. In a trouser-pressing apparatus as set forth in claim 10 in which said holding means include a pair of bow-shaped members having each opposite ends and being pivoted intermediate the opposite end thereof for movement toward and away from said form, and a string member extending between the opposite ends of each bow-shaped member.

12. A trouser pressing apparatus as set forth in claim 7, wherein said elongated form is hollow and substantially vertical and is formed in its wall with a plurality of openings, the interior of said form being adapted to be supplied with steam and to be placed in communication with a source of suction so that the steam can have access to trousers through said openings and so that the suction will draw trousers against said form through said openings, said openings being upwardly inclined so that any condensate will collect at the lower interior portion of said form, and further wherein said presser plate units are substantially co-extensive with said form when said form is in said pressing position.

13. The combination set forth in claim 7, wherein the lower portion of said form is provided with a curvature, corresponding to the curvature of the crotch of a pair of trousers and includes a pair of plates which have edge portions which approach toward each other and engage the form in the region of said edge with a substantially each other at the lower portion of said form to provide V-shaped cross section adapted to engage a pair of trousers at the crotch thereof.

14. The combination set forth in claim 7 further comprising a pair of cuff-engaging members located on each side of said form adjacent an upper end thereof and adapted to enter into the interior of a trouser leg at the cuff end thereof, and means, operable at the will of the operator, and acting on the pairs of the cuff-engaging members for applying fluid pressure thereto to spread members of each pair apart from each other into engagement with the trouser leg for retaining the latter so that the cuff-engaging members will hold the trousers on the form.

15. The combination set forth in claim 7, further comprising a pair of cuff-engaging, thin plates located on each side of said form adjacent said upper portion thereof and adapted to enter into each trouser leg and engage the cuff thereon and press against the creases of the trousers for stretching the same along said form and for maintaining the crotch of the trousers against the lower portion of said form, and spring means cooperating with each pair of said cuff-engaging members for pressing the same apart from each other into engagement with the creases in the trousers.

16. The combination set forth in claim 4, wherein said guide means further include a track means including an operating track portion in alignment with the space between said units, a plurality of additional track portions respectively carrying said forms, and a switch for switching said operating track portion into connection with a selected one of said additional track portions so that by operation of said switch the operator can move a form which is carried by said operating track portion from the latter onto an unoccupied additional track portion and then another form can be moved to said operating track portion.

References Cited by the Examiner

UNITED STATES PATENTS

| | | | |
|---|---|---|---|
| 1,375,808 | 4/21 | Witbeck | 223—95 X |
| 1,472,978 | 11/23 | Hanes | 223—76 |
| 2,241,373 | 5/41 | Rawlison et al. | 223—57 |
| 2,486,486 | 11/49 | Lauzon | 223—57 |
| 2,529,899 | 11/50 | Bayler | 38—21 |
| 2,560,920 | 7/51 | Berger | 223—57 |
| 2,669,374 | 2/54 | Jones | 223—57 |
| 2,698,705 | 1/55 | Hitz | 223—57 |
| 2,769,586 | 11/56 | Lee | 223—95 |
| 2,834,523 | 5/58 | Maxwell et al. | 223—57 |
| 2,854,177 | 9/58 | Strike et al. | 223—57 |
| 2,948,442 | 8/60 | Kremer et al. | 223—57 |
| 2,954,150 | 9/60 | Pace | 223—95 |
| 2,994,978 | 8/61 | Skovira | 38—21 |
| 3,117,704 | 1/64 | McMillan | 223—73 |

FOREIGN PATENTS 1,055,794   10/53   France.

JORDAN FRANKLIN, *Primary Examiner.*

THOMAS J. HICKEY, *Examiner.*